United States Patent [19]

Steffen et al.

[11] Patent Number: 4,997,034
[45] Date of Patent: Mar. 5, 1991

[54] HEAT EXCHANGER

[75] Inventors: James E. Steffen, Woodbury; Vaughn B. Grannis, Inver Grove Heights; Frank S. Schroder, Afton, all of Minn.

[73] Assignee: Minnesota Mining and Manufacturing Company, Saint Paul, Minn.

[21] Appl. No.: 137,193

[22] Filed: Dec. 23, 1987

[51] Int. Cl.$^5$ .................. H01L 23/467; F28D 15/00
[52] U.S. Cl. .................. 165/104.34; 165/41; 165/122; 165/104.33; 165/185; 361/384
[58] Field of Search .................. 165/104.33, 104.34, 165/185, 41, 122; 361/383, 384; 432/77, 81, 219, 221, 223, 254.2

[56] References Cited

U.S. PATENT DOCUMENTS

| | | | |
|---|---|---|---|
| 2,293,813 | 8/1942 | Fisher | 165/185 |
| 2,544,183 | 3/1951 | Rogers et al. | 165/104.34 |
| 3,800,864 | 4/1974 | Hauser et al. | |
| 3,964,286 | 6/1976 | Oerther et al. | |
| 4,500,944 | 2/1985 | Roberts et al. | 361/384 |
| 4,537,034 | 8/1985 | Crouch | |
| 4,638,858 | 1/1987 | Chu | 165/185 |
| 4,682,651 | 7/1987 | Gabuzda | 165/185 |
| 4,715,438 | 12/1987 | Gabuzda et al. | 165/185 |

FOREIGN PATENT DOCUMENTS

| | | |
|---|---|---|
| 207677 | 1/1987 | European Pat. Off. |
| 78566 | 12/1894 | Fed. Rep. of Germany |
| 659774 | 5/1938 | Fed. Rep. of Germany |
| 861141 | 1/1953 | Fed. Rep. of Germany |
| 2099803 | 3/1972 | France |
| 368816 | 4/1963 | Switzerland |
| 206044 | 4/1986 | U.S.S.R. ............... 361/386 |
| 529037 | 11/1940 | United Kingdom |

OTHER PUBLICATIONS

Coles, R. E., *IBM Technical Disclosure Bulletin*, vol. 6, No. 2, 7/1963.

Primary Examiner—Albert W. Davis, Jr.
Attorney, Agent, or Firm—Kinney & Lange

[57] ABSTRACT

A heat exchanger including a plate of heat conductive material having a first major face and second major face. An array of a plurality of integral heat transfer elements projecting from the first face and a fan to cause a flow of a heat transfer fluid past the heat transfer elements thereby transferring heat between the heat exchanger and the heat transfer fluid.

20 Claims, 10 Drawing Sheets

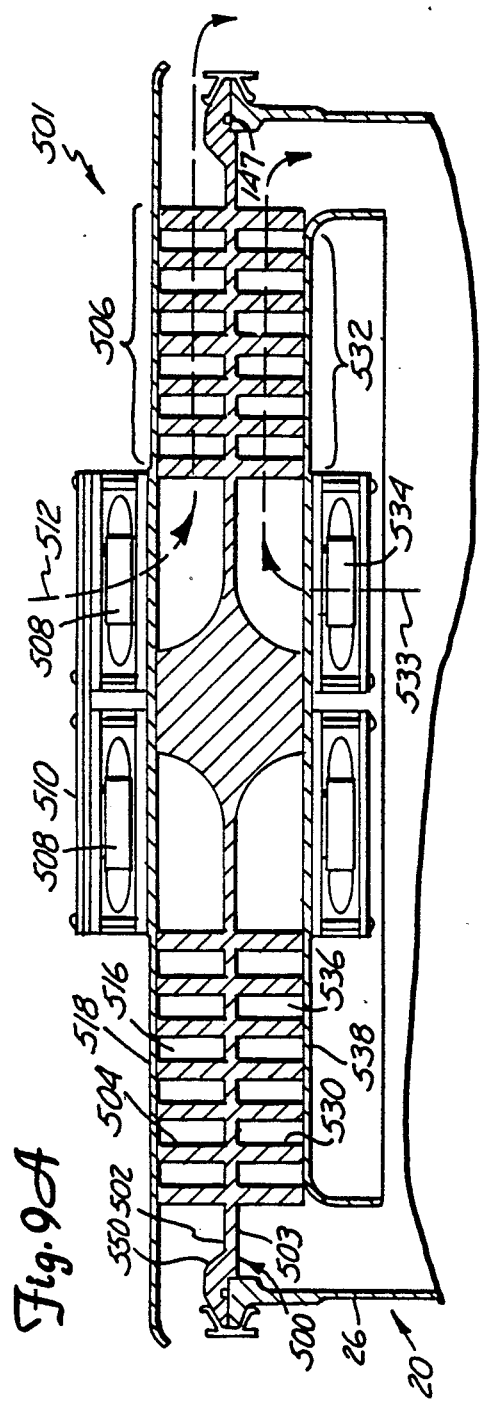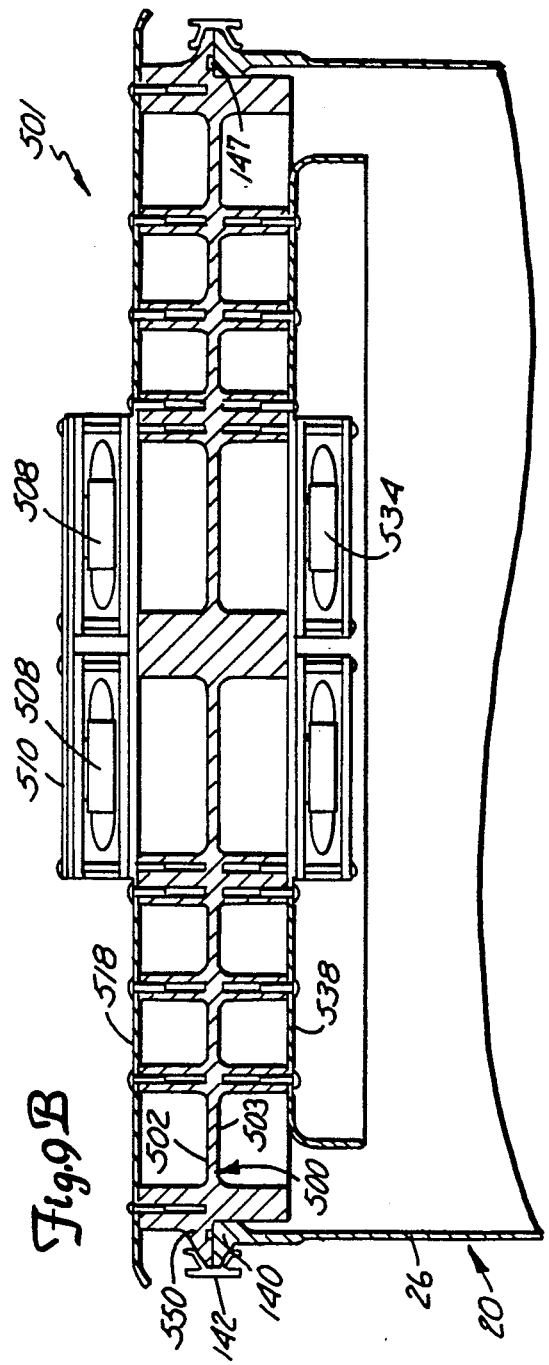

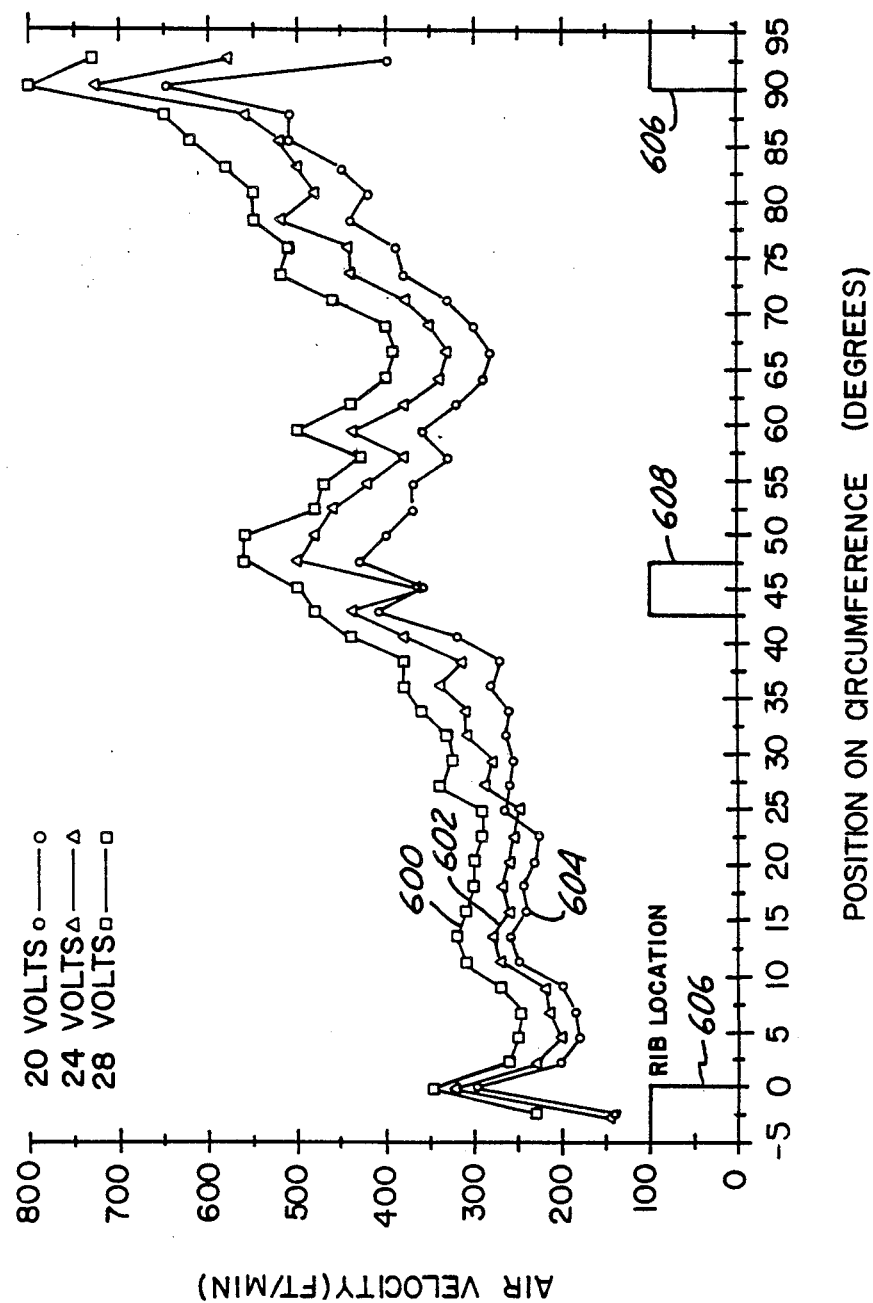

४,९९७,०३४

HEAT EXCHANGER

BACKGROUND OF THE INVENTION

1. Field of the Invention

The present invention relates to heat exchangers and, particularly, the present invention relates to heat exchangers having a plurality of heat conductive pins extending from a first surface wherein heat is transferred between the pins and a heat transfer fluid flowing past the pins.

2. Description of the Prior Art

U.S. Pat. No. 3,800,864 issued to Hauser et al. discloses a cooling system for gas turbine engines including discrete pin-fins upon a face of a wall bounding a hot gas passage. The discrete pin-fins extend into a cooling fluid plenum.

U.S. Pat. No. 4,638,858 issued to Chu discloses heat conducting pins or posts mounted in holes in a base to be cooled. The pins carry heat conducting wings that extend oppositely in the upstream and downstream direction of the flow of a coolant across the base.

U.S. Pat. No. 3,964,286 to Oerther et al. discloses an apparatus for bending fragile pin-fins on a finned tubed heat exchanger.

SUMMARY OF THE INVENTION

A heat exchanger includes a plate of heat conductive material having a first major face and a second major face, an array of a plurality of integral heat transfer elements projecting from the first face, and a fan causing a flow of heat transfer fluid past the heat transfer elements thereby transferring heat between the heat exchanger and the heat transfer fluid.

BRIEF DESCRIPTION OF THE DRAWINGS

FIGS. 9A and 9B are sectional views of alternative embodiments of the present invention.

FIG. 10 is a graphical view of air velocity with respect to angular position in a quadrant.

DETAILED DESCRIPTION OF THE PREFERRED EMBODIMENTS

The subject invention combines three important functions. First, the invention serves to transfer heat. Second, the invention serves as a structural part of a container. Third, the invention provides a hermetic seal to a container closure.

Figure 1:
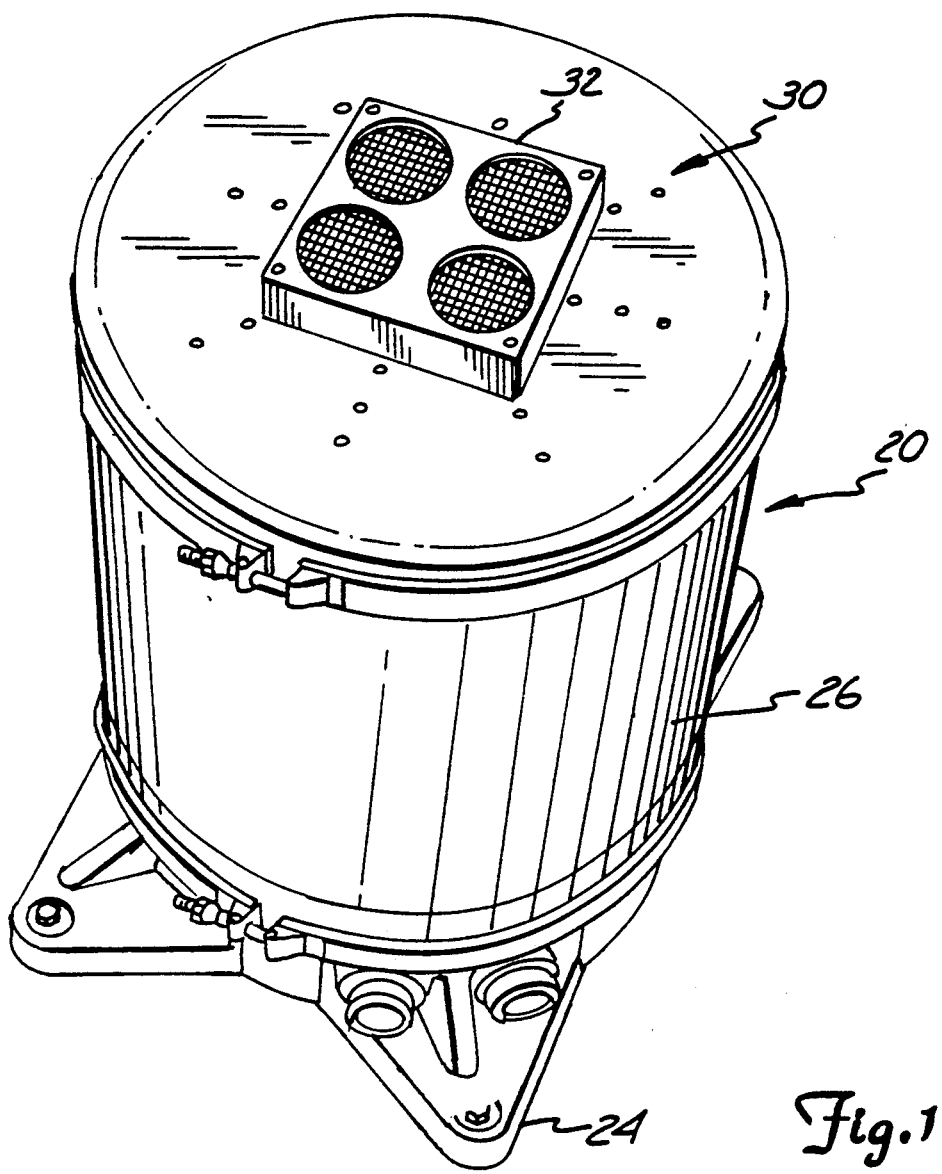
FIG. 1 is a perspective view of the heat exchanger of the present invention in use.

In FIG. 1, a NASA Experimental Apparatus Container 20 (EAC) is shown. The EAC 20 includes mounting brackets 24 and a cylindrical wall 26. Additionally, a heat exchanger 30 of this invention is installed upon the EAC 20 and replaces the cover supplied by NASA. The heat exchanger 30 includes an upper fan housing 32. An Electronics Module (not shown) may be used to control the EAC 20 and/or the heat exchanger 30. The Electronics Module (not shown) may be external or may be internally disposed within the EAC 20.

Figure 2:
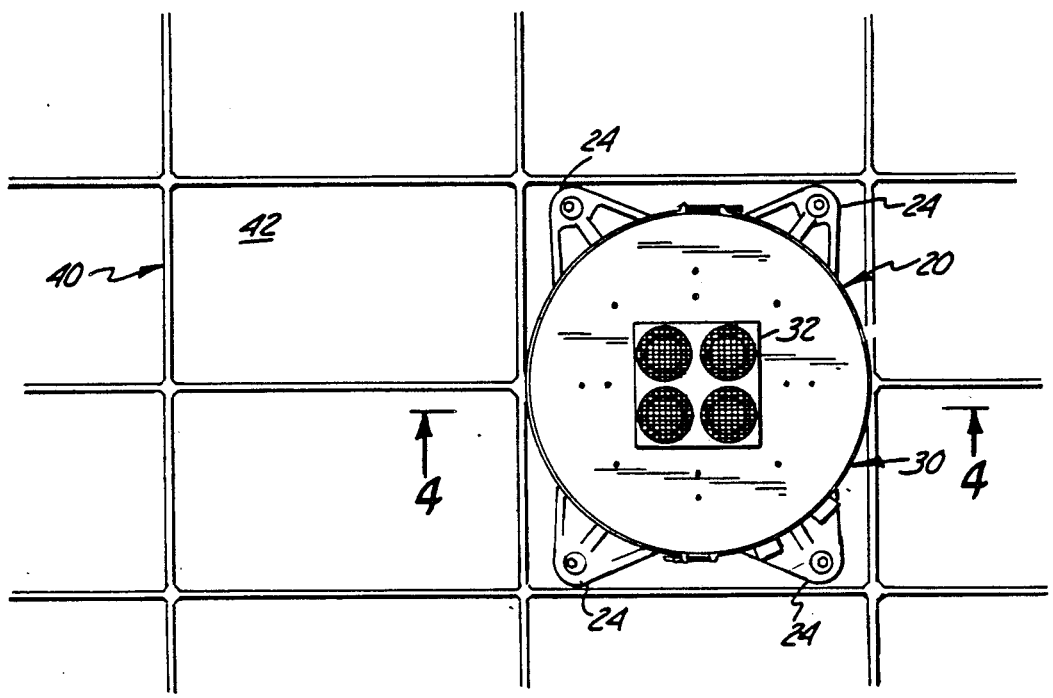
FIG. 2 is a top view of the heat exchanger of the present invention in use.

FIG. 2 is a top view of the EAC 20 installed on a NASA Orbiter Mid-deck wall 40. The mounting brackets 24 provide a rigid mounting of the EAC 20 upon the Mid-deck wall 40. The heat exchanger 30 is installed upon the EAC 20 and includes the upper fan housing 32.

The Orbiter Mid-deck wall 40 includes a plurality of locker spaces 42, which are generally of rectangular dimensions. The EAC 20 requires two mid-deck locker spaces 42 for mounting.

Figure 3:
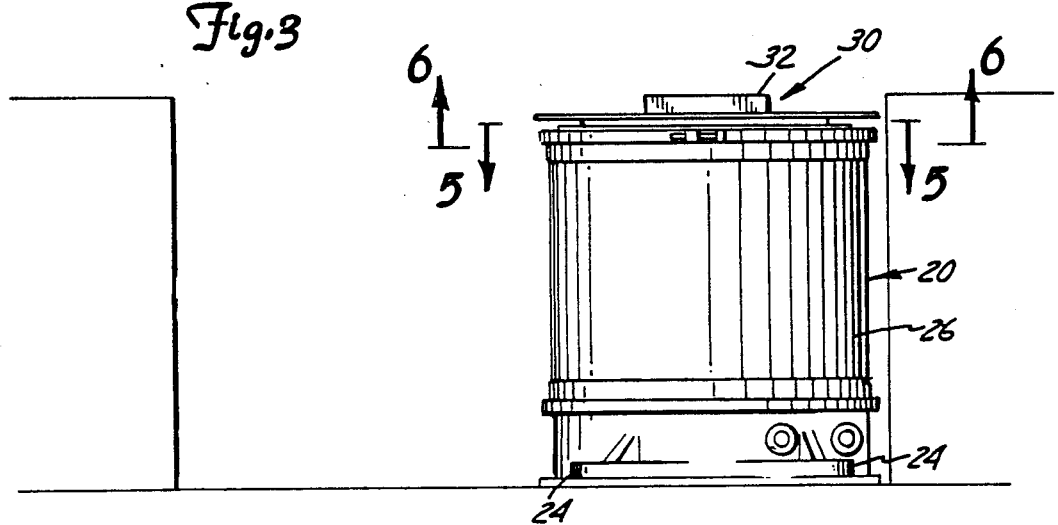
FIG. 3 is a side view of the heat exchanger of the present invention.

In FIG. 3, a side view of the EAC 20 mounted on the Orbiter Mid-deck wall 40 is shown. Again, the EAC 20 includes the mounting brackets 24 and the cylindrical wall 26. Additionally, installed upon the EAC 20 is the heat exchanger 30. The heat exchanger includes the fan housing 32.

The EAC 20 houses experiments involving chemical or materials processing to be performed in the absence of gravity. Within a NASA Space Shuttle, the Orbiter Mid-deck area 40 lies within an area occupied by astronauts. To protect astronauts from harmful or toxic materials which might be produced by such space experiments, some chemical experiments performed in space are required to be housed in an EAC 20, or other suitable container having a multiple containment enclosure. For example, a triple containment enclosure, by which is meant that an experiment is contained within a defined first container (first level of containment) which, in turn, is contained within a second container (second level of containment) which, in turn, is contained within a final, third container (third level of containment). Additionally, some or all of these containers may be hermetically sealed. Many experiments tend to generate heat. A drawback to the triple containment enclosure is that it is also a barrier to heat transfer. In order to allow efficient thermal regulation of experiments within the triple containment enclosure of the EAC 20, the heat exchanger 30 of this invention was developed.

Figure 4:
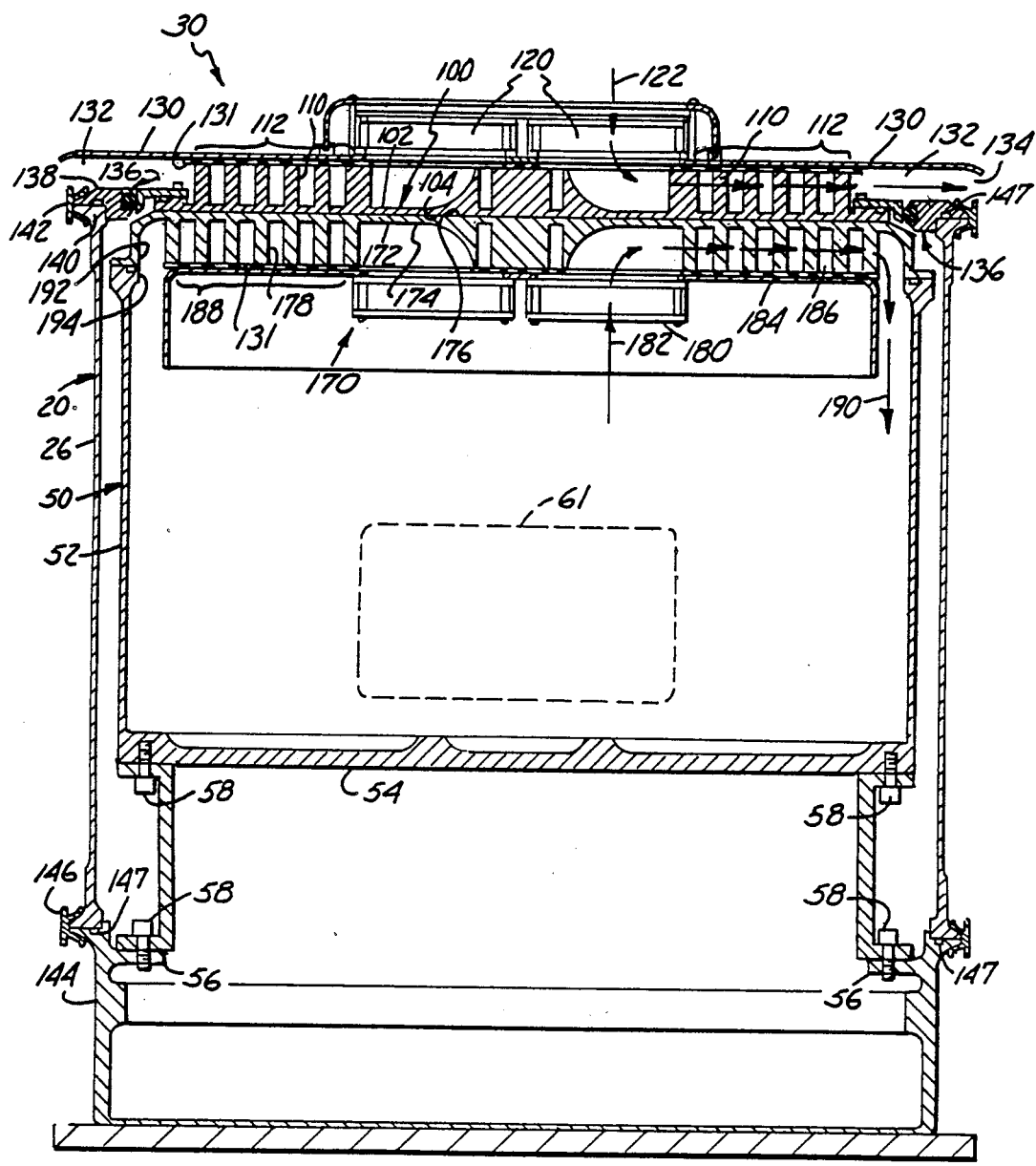
FIG. 4 is a sectional view along the lines 4—4 of FIG. 2.

FIG. 4 is a sectional view along the lines 4—4 of FIG. 2. The EAC 20 includes the cylindrical wall 26. The EAC 20 serves as the third, or outermost level of containment, of the triple containment enclosure. Within the EAC 20 is a second level of containment, a second containment canister 50 (SCC). The SCC 50 includes a cylindrical wall 52 which is coaxially located within the cylindrical wall 26 of the EAC 20. The SCC 50 also includes a base 54 which is secured to an inwardly directed flange 56 of the EAC 20 by bolts 58. An innermost or primary container 61 is disposed within the SCC 50. The primary container 61 provides the first level of containment and is a source of heat. Further, other components may be present within the SCC 50 including other heat sources and other containers.

The heat exchanger 30 of this invention serves in part as a cover on the EAC 20. The heat exchanger 30 includes a plate 100. The plate 100 is formed of a heat conductive material. In a most preferred embodiment, the plate 100 is formed of aluminum or an aluminum alloy and is approximately 0.125 inches thick and has an approximately 14 inch diameter. Alternatively, copper or other suitable conductive materials can be used. The plate 100 has a first major face 102 and a second major face 104.

Projecting from the first major face 102 are a plurality of an integral heat transfer elements 110. Preferably, the plate 100 and heat transfer elements 110 of the heat exchanger 30 are machined from one piece of heat conductive material. The integral heat transfer elements 110 are arranged in arrays 112. In a preferred embodiment, the integral heat transfer elements 110 project approximately 1.0 inch from the plate 100.

The heat exchanger 30 also includes at least one fan 120 which drives a flow of the heat transfer fluid as generally indicated by arrow 122, for example ambient air, parallel to the first major face 102 of the plate 100 and past the elements 110. In a preferred embodiment, the fan 120 is one of a set of four fans 120 which directs air in a flow direction 122. In this embodiment, the flow direction 122 of air is first driven toward the plate 100 and is then directed substantially parallel to the plate 100.

The flow of air is confined by a panel 130 which serves as a boundary defining in part a plenum space 132. The panel 130 is spaced apart from the plate 100. In the preferred embodiment, the panel 130 extends over the integral heat transfer elements 110 projecting from the first face 102 of the plate 100. Optionally, a vibration damper 131 lies between the heat transfer elements 110 and the panel 130. Thus, the heat transfer fluid flow 122 is forced into the plenum 132 by the fan 120. The flow 122 is in a generally radial direction and contacts the integral heat transfer elements 110 projecting from the first face 102 of the plate 100. The contact between the flow 122 of heat transfer fluid and the integral heat transfer elements 110 allows heat to be transferred. Because the heat transfer elements 110 are integral with the plate 100, heat is conducted from or to the second face 104 through the plate 100 into the integral heat transfer elements 110 and then transferred to or from the flow direction 122 of heat transfer fluid. The flow direction 122 of heat transfer fluid exits the plenum space 132 at a port 134. Thus, the ambient air serves as a heat sink for the heat exchanger 30.

In an alternative arrangement, the fan 120 may operate to pull air in the opposite direction, thereby reversing the flow 122. In this alternative embodiment, air enters the plenum space 132 at the port 134, contacts the heat transfer elements 110 and exits perpendicular to the plate 100 through the fan 120. This alternative embodiment avoids any preheating of the air flow by the fan motor. However, this alternative arrangement is not preferred for use in the Space Shuttle for the following reason. A discharge of air through the fan 120 tends to blow in an astronaut's face which is undesirable.

The heat exchanger 30 further includes a seal ring assembly 136 at the periphery of the plate 100. At the periphery of the seal ring assembly 136 is a mounting rim 138 which mates with a mounting rim 140 at the terminus of the cylindrical wall 26 of the EAC 20. The mating arrangement between the mounting rim 138 of the heat exchanger 30 and the mounting rim 140 of the EAC 20 is maintained by clamping means, specifically a band clamp 142. The band clamp 142 forces the mounting rim 138 tightly against mounting rim 140 when the circumference of the band clamp 142 is reduced. The band clamp 142 and mounting flange arrangement 140 is a feature on NASA provided EAC's 20. A similar clamping means or arrangement is also present on the EAC 20 where the cylindrical wall 26 is joined to a base member 144 by a second band clamp 146. Hermeticity is provided by elastomeric O-rings 147 in both seals.

Thus, the heat exchanger 30 has a dual function. First, the heat exchanger 30 serves as a heat exchanger transferring heat to or from the second major face 104 to the heat transfer fluid of flow 122. Second, the heat exchanger 30 serves as a portion of the outer containment system of the EAC 20.

In an especially preferred embodiment, a second similar heat exchanger 170 is in a back-to-back arrangement with the first heat exchanger 30. The second heat exchanger 170 has an integral plate 172 made of heat conductive material. Preferably the heat conductive material is aluminum or an aluminum alloy. Alternatively, copper or other suitable heat conductive materials can be used. The plate 172 has a first major face 174 and a second major face 176. The second major face 176 of the second heat exchanger 170 is in a physical and heat conducting contact with the second major face 104 of the first heat exchange unit 30.

A plurality of integral heat transfer elements 178 project from the first face 174 of the plate 172. The second heat exchanger 170 also includes at least one fan 180 which serves as a means to drive a flow 182 of a heat transfer fluid, preferably a gas such as air or nitrogen through a plenum space 186. The plenum space 186 is bounded in part by the first major face 174 of the plate 172 and a panel 184. The panel 184 and the first major face 174 are spaced apart by the integral heat transfer elements 178. The flow of heat transfer fluid as indicated by arrow 182 through a plenum 186 results in intimate contact between the heat transfer fluid and the integral heat transfer elements 178.

As in the first heat exchange unit 30, the heat transfer elements 178 are arranged in a wedge-shaped array 188. Also, a flow, as indicated by arrow 182, which begins at the fan 180 perpendicular and inwardly toward the plate 172 and is then directed radially outwardly, substantially parallel to the plate 172 through the plenum 186, and exits through a port 190.

The second heat exchange element 170 serves as a structural member of the SCC 50 and further serves to maintain hermeticity of the SCC 50. A flange 192 is located at the periphery of the plate 172. The flange 192 is in mating contact with a flange 194 at the terminus of the cylindrical wall 52 of the SCC 50.

Because the SCC 50 is a sealed system, the flow as indicated by arrows 182 circulates through the SCC 50 and returns to the second heat exchanger 170. Thus, the present invention, as used in this embodiment serves to transfer heat resulting from the first container 61 located within the SCC 50. Forced convection by the fan 180 transfers heat to the integral heat transfer elements 178, then by conduction to the plate 172. Heat is then conducted between the second major face 176 of the plate 172 to the heat exchanger 30 of the EAC 20, across the interface between the second major face 176 of heat exchanger 170 and the second major face 104 of heat exchanger 30. Heat is then conducted to the integral heat transfer elements 110 of heat exchanger 30 and then forced convection of the heat transfer fluid by fans 120 results in heat being transferred to the heat transfer fluid, such as ambient air, of the Orbiter Mid-deck.

Figure 5:
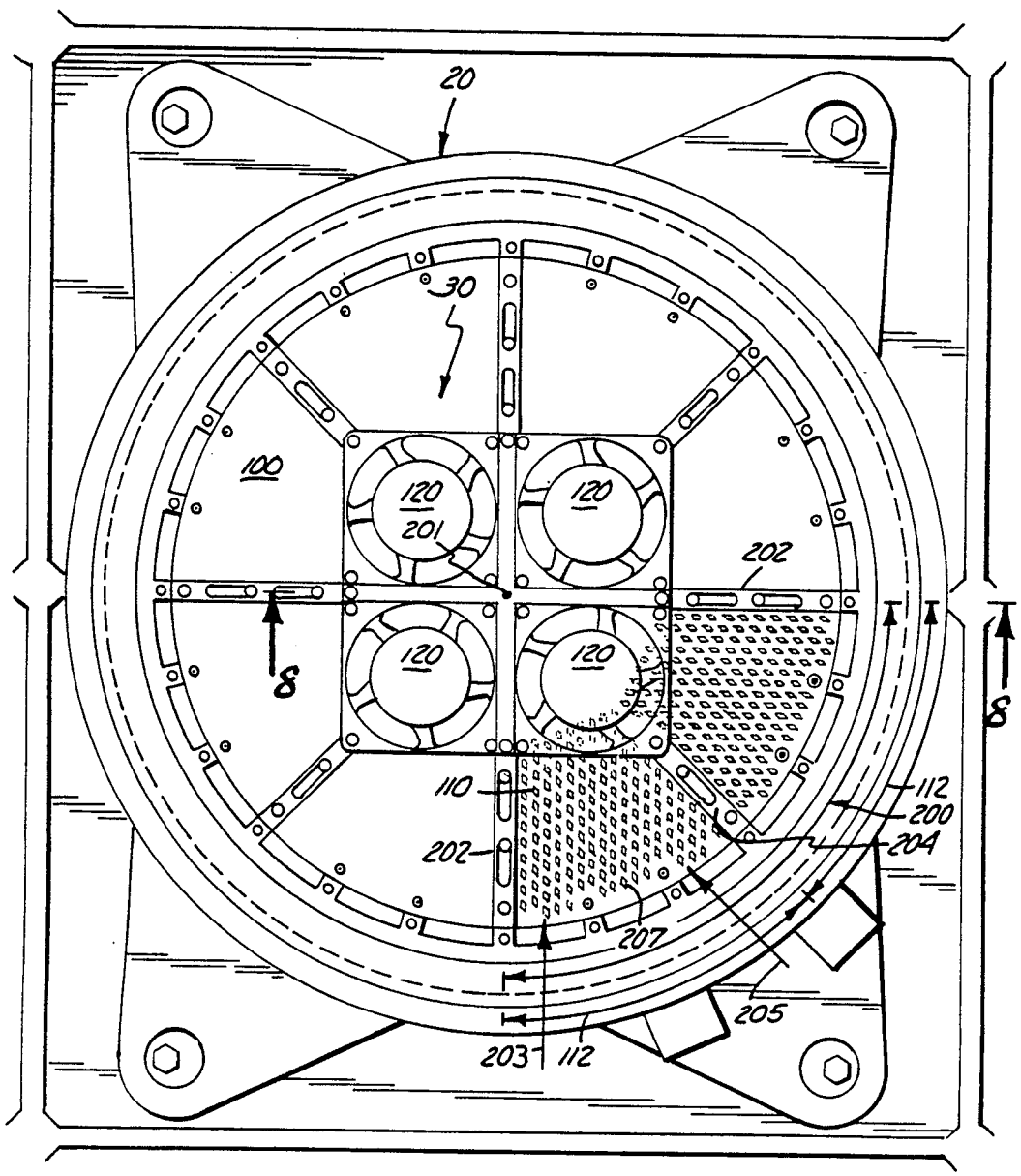
FIG. 5 is a sectional view along the lines 5—5 of FIG. 3.

In FIG. 5, a sectional view of the first heat exchanger 30 is shown along the lines 5—5 of FIG. 3 with a portion or quadrant 200 shown in detail. The first heat exchanger 30 is mounted on the EAC 20. A fan 120 is associated with each quadrant 200 of the heat exchanger 30. Each fan 120 is mounted proximal to the apex 201 (center of plate 100) of the quadrant 200. The heat exchanger 30 includes four quadrants 200 disposed about a center 201. Within each quadrant 200, the integral heat transfer elements 110 are arranged in the arrays 112. Each quadrant 200 contains a fan 120 and a pair of arrays 112; preferably these arrays 112 are identical in each quadrant 200.

Each quadrant 200 is defined by a pair of full ribs 202 that extend radially outwardly. The full ribs 202 serve to support the panel (130 of FIG. 4) and additionally serve as a boundary of the plenum 132 associated with each fan 120. Between the two ribs 202 is a half rib 204. The half rib 204 also serves, in part, to support the panel 130 and, in part, to split the flow (122 of FIG. 4) between the pair of arrays 112. In the preferred embodiment, the full ribs 202 and half ribs 204 project approximately 1.0 inch from the plate 100.

The heat transfer elements 110 are diamond-shaped in a cross section parallel to the first major face 174 in the preferred embodiment. Other alternative shapes include circular or square cross sections. The preferred diamond shape is based upon consideration of the combination of ease of manufacture, static pressure and heat transfer.

Further, in the preferred embodiment, the integral heat transfer elements 110 within the arrays 112 are arranged in rows 203 and columns 205. The most preferred embodiment of rows 203 and columns 205 involves rows 203 arranged parallel to the full ribs 202 and columns 205 arranged parallel to the half ribs 204. The rows 203 and columns 205 intersect at approximately a 45° angle. The 45° angle is also the preferred angle for the preferred diamond-shape of the integral heat transfer elements 110. Further, the rows 203 and columns 205 are preferably spaced apart by approximately 0.125 inch. This is slightly larger than the preferred size of a face 207 of the diamond pin-fins 110, which is approximately 0.10 inch. The faces 207 of the pin-fins 110 intersect at an angle of about 45° for two opposing edges of the pin-fins 110 and at an angle of about 135° for the two remaining edges of the pin-fins 110. The pin-fins 110 are aligned so that the about 45° angles are radially in line with the flow 122 from the fans 120.

While not being bound by theory, the pin-fins 110 are highly effective in transferring heat to the flow 122 of air, because:

first, the pin-fin 110 has a large surface area and a high fin efficiency;

secondly, the array 112 of pin-fins 110 continually break up both the thermal and hydrodynamic boundary layers, thus increasing the heat transfer coefficient; and thirdly, the preferred diamond-shaped pin-fin 110 and the preferred alignment relative to the flow 122 accomplishes heat transfer with minimal static pressure drop in the heat transfer fluid.

These factors improve mixing and heat transfer.

Figure 6:
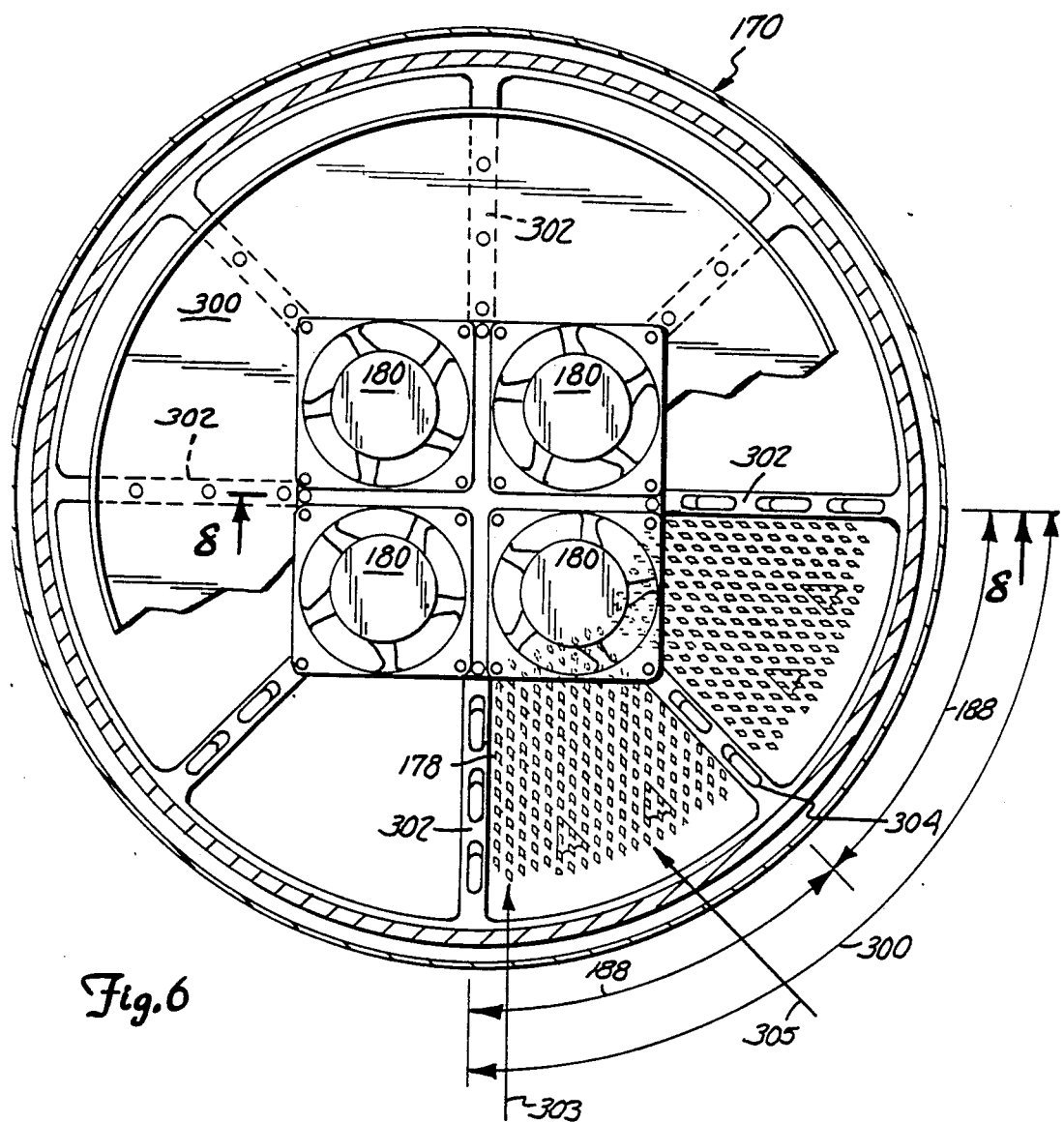
FIG. 6 is a sectional view along the lines 6—6 of FIG. 3.

In FIG. 6, a sectional view taken along the lines 6—6 of FIG. 3 is presented with a portion illustrated in detail. In this view, the second heat exchanger 170, which is associated with the SCC 50, is shown. The heat exchanger 170 has four fans 180 and is split into four quadrants 300 by full ribs 302. The integral heat transfer elements 178 are arranged in arrays 188. In the preferred embodiment, the second heat exchanger 170 is nearly a mirror image of the first heat exchanger 30 and is in physical contact, one heat exchanger 170 with another heat exchanger 30 at the junction of their respective faces 176 to 104.

The integral heat transfer elements 178 are again arranged in a pair of arrays 188. The arrays 188 are separated by a half rib 304. Both the half ribs 304 and the full ribs 302 serve to support the panel 184 which defines the plenum 186 enclosing the arrays 188 of the integral heat transfer elements 178. Within the arrays 188, the heat transfer elements 178 are arranged again in rows 303 and columns 305. The rows 303 and columns 305 are parallel to the full ribs 302 and half ribs 304 which bound the arrays 188 of the heat transfer elements 178. Further, the rows 303 and columns 305 are spaced apart approximately 0.125 inch. The full ribs 302, half ribs 304 and heat transfer elements 178 all preferably project approximately 1.0 inch from the plate 172. As with the plate 100 of the first heat exchanger 30, the plate 172 of the second heat exchanger 170 is preferably approximately 0.125 inch thick and has a diameter of approximately 14 inches and is machined from a single piece of aluminum. Again, a diamond-shaped cross section is preferred for the heat transfer elements 178.

Additionally, the full ribs 302 defining each quadrant 300 serve as boundaries of the plenum 186 of FIG. 4. The half rib 304 additionally serves to split the flow 182 of heat transfer fluid at the boundary between the two arrays 188. The half ribs 304, and ribs 204 of FIG. 5 as well, are important because the fans 180, and fans 120 of FIG. 5, tend to produce a radial swirl component in the flows 182 and 122, respectively, as illustrated in FIG. 4. The half ribs 304, and half ribs 204 of FIG. 5, split the flows 182 and 122, respectively, as illustrated in FIG. 4 between the paired arrays 188 and arrays 112, respectively.

Figure 7:
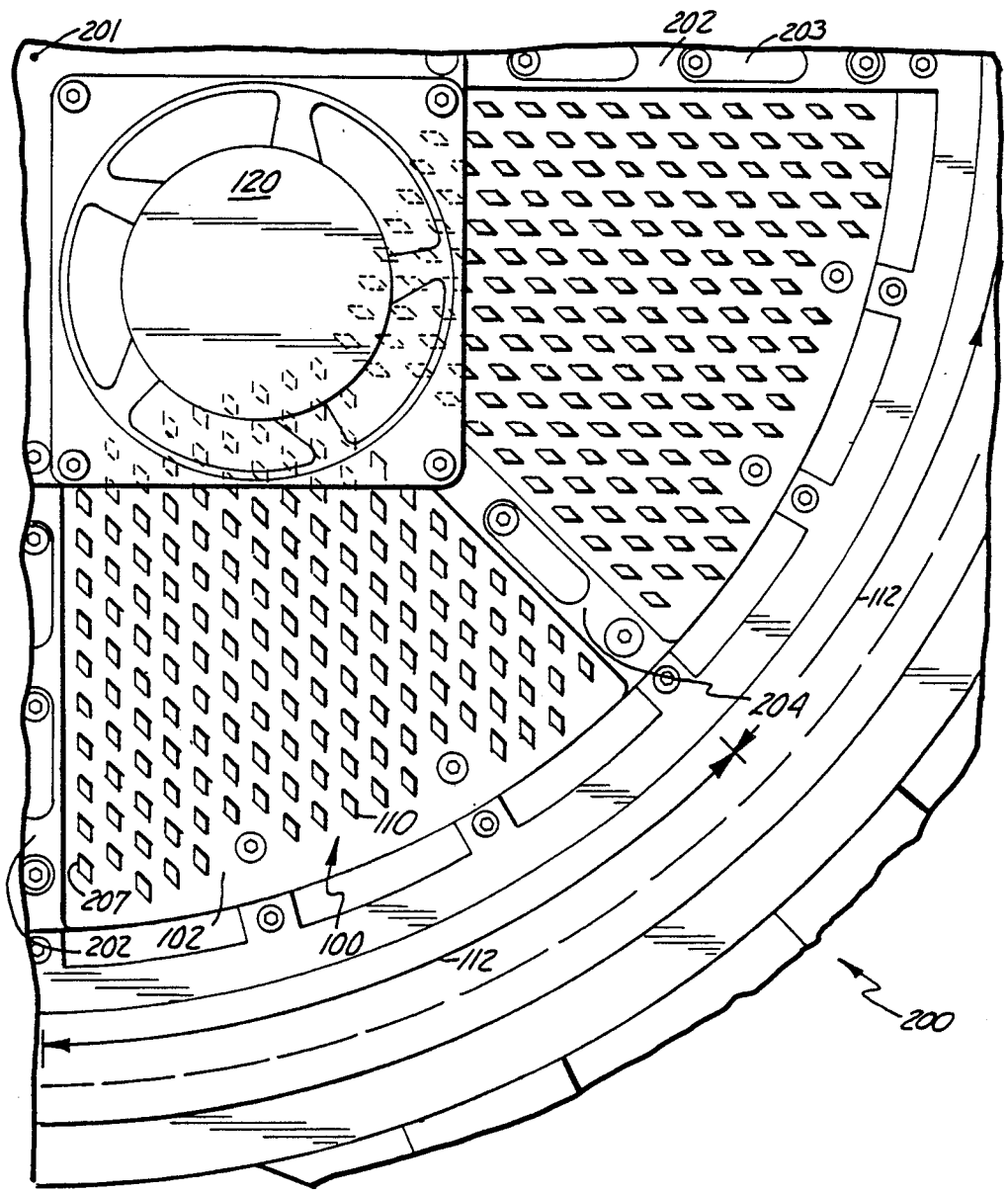
FIG. 7 is an enlarged sectional view to show additional detail of a quadrant of FIG. 5.

FIG. 7 is an enlarged view of the detailed quadrant of FIG. 5. This view again shows the pair of arrays 112 of the integral heat transfer elements 110. The preferred embodiment of the heat transfer element 110 is the diamond-shape which may be described as a "pin-fin" 110. The pin-fins 110 are integral to the plate 100 and project upwardly from the first major face 102. The diamond-shaped pin-fins 110 have walls 207 parallel to the nearest full rib 202 and walls 207 parallel to the nearest half rib 204. The fan 120 is located proximate to the apex 201 (center of plate 100) of the quadrant 200. The array 112 is generally wedge-shaped with the number of pin-fins 110 increasing in a direction distal to the fan 120.

The full ribs 202 and half ribs 204 are preferably approximately 0.413 inch wide and include a plurality of centered channels 203 which are approximately 0.283 inch wide. The full ribs 202 meet at the center 201 of the plate 100 and help to add rigidity and "stiffen" the heat exchanger.

Figure 8:
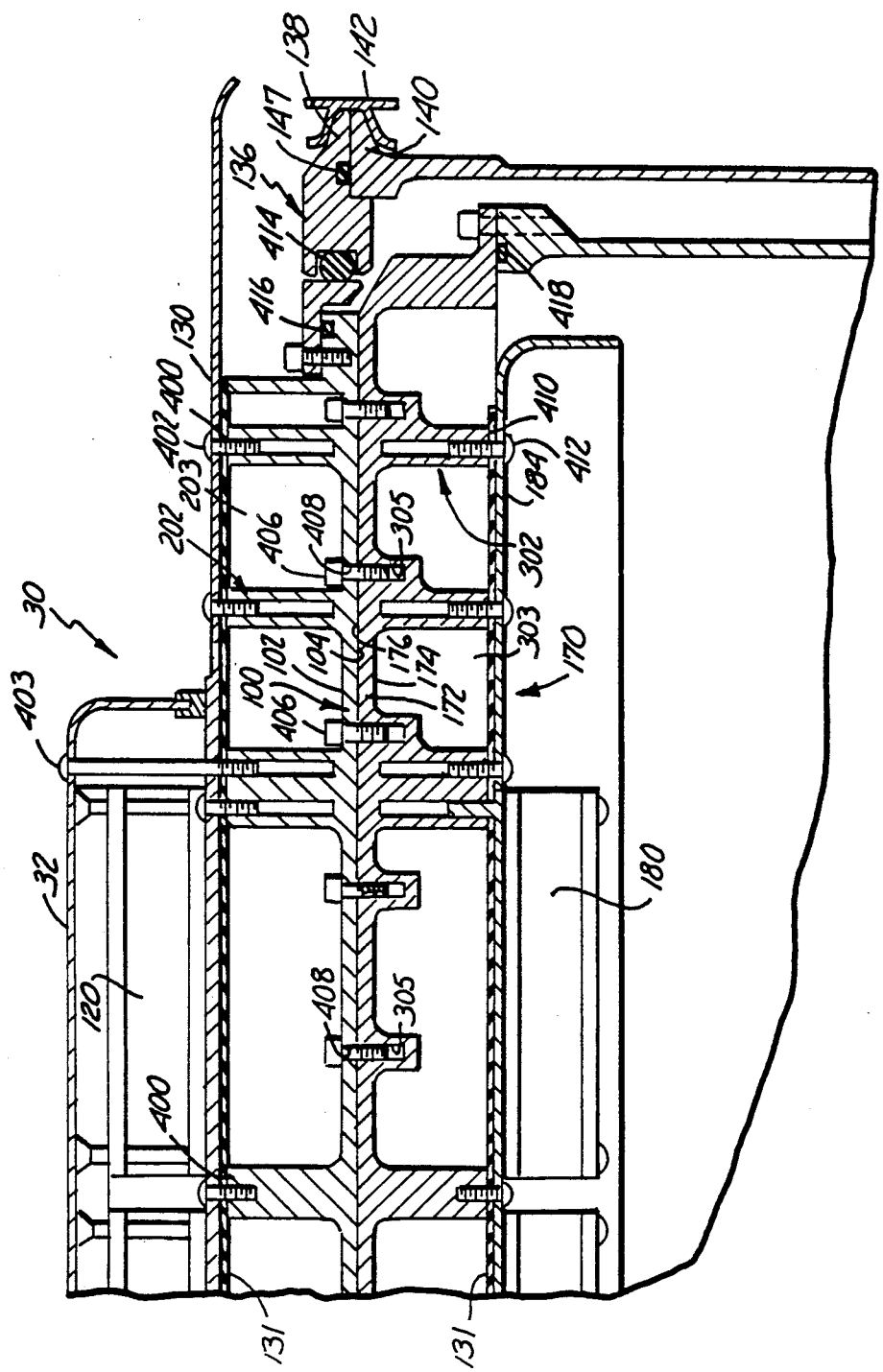
FIG. 8 is a sectional view through a portion of a full rib of the heat exchanger of this invention along the lines 8—8 of FIGS. 5 and 6.

In FIG. 8, a portion taken along the lines 8—8 of FIG. 5 is presented which details the full ribs 202 of the first heat exchanger 30 and full ribs 302 of the second heat exchanger 170. The full rib 202 is integral with the plate 100, projecting from the first major face 102. The upper surface of the rib 400 supports the panel 130. The panel 130 is held in place by a number of threaded fasteners or screws 402.

The rib 202 also includes channels 203 extending from the upper surface 400 to the first major face 102. Seal screws 406 are used in the channels 203 whenever openings 408 extend through the plate 100. The seal screws 406 are threaded into the rib 302 of the second heat exchanger 170. The seal screws 406 serve to maintain the heat conductive interface and physical contact between the second major face 104 of plate 100 of the first heat exchanger 30 and the second major face 176 of the plate 172 of the second heat exchanger 170.

Additionally, the seal screws 406 maintain a hermetic seal in the EAC. The seal ring assembly 136 includes an O-ring 414 which compensates for thermal expansion. An additional O-ring 416 is compressed at the contact between the seal ring assembly 136 and the plate 100. Together, O-rings 147, 414 and 416 provide a hermetic seal for the EAC 20. Additionally, an O-ring 418 provides a hermetic seal between the inner plate 172 and the SCC 50.

The surface 410 of the lower rib 302 supports the panel 184. The panel 184 is attached to the rib 302 by screws 412. The fan housing 32 is attached to the rib upper surface 400 by screws 403 and serves to protect the astronauts from contact with the fan 120. The internal fans 180 of the second heat exchanger 170 lack an equivalent protective covering to the exterior covering 32.

The full ribs 302 of the second heat exchanger 170 also include channels 303. The channels 303 are mirror image equivalents of the channels 203 with a single exception: the channels 303 are left solid opposite the sealing screws 406. Threaded receiving holes 305 extend inwardly from the second face 176 such that the heat exchangers 30 and 170 may be fastened together in the preferred back-to-back arrangement. The threaded receiving holes 305 are blind holes such that they do not breach the SCC 50.

An alternative embodiment 501 of the present invention is illustrated in FIGS. 9A and 9B. The embodiment 501 is suitable for use as a portion of an individual containment canister such as the EAC 20, but without functioning as part of a second level of containment. In such an arrangement, other containment canisters may be optionally present, but remain independent of the heat exchanger 501. The embodiment 501 includes a single heat conductive plate 500 having a first major face 502 and a second oppositely facing major face 503. The alternative single plate is preferably approximately 0.125 inch thick and approximately 14 inches in diameter. Projecting from the first major face 502 are a plurality of integral heat transfer elements 504.

Preferably each of the integral heat transfer elements 504 have a diamond-shaped cross section and are arranged in a wedge-shaped array 506 of rows and columns parallel to ribs (not shown) in an arrangement similar to the arrangement illustrated in FIGS. 5 and 6. The face 502 is divided into quadrants and each quadrant is associated with a fan 508 and has a pair of arrays 506 separated by a half rib (not shown). The fan 508 is located inside a fan housing 510 and serves to drive a flow 512 of heat transfer fluid, such as air, through a plenum 516. The plenum 516 is bounded by a panel 518 and the first major face 502 of the plate 500.

Projecting from the second major face 503 of the plate 500 are a plurality of integral heat transfer elements 530. Each of the heat transfer elements 530 have a diamond-shaped cross section and are arranged in a wedge-shaped array 532 of rows and columns. A pair of the arrays 532 are located within each quadrant. Each quadrant is associated with a fan 534 which drives a flow of heat transfer fluid as indicated by arrow 533, such as air, through a plenum 536. The plenum 536 is defined in part by a panel 538 and in part by the second major face 503 of the plate 500. Additionally, the plenum 536 is defined by full ribs (not shown) and segmented between the pair of arrays 532 by a half rib (not shown).

The rib (not shown) is integral with the plate 500 projecting from the first major face 502 and also from the second major face 503. The rib (not shown) serves as a mounting point for the panels 518 and 538 as well as the fan 508 within the housing 510 and the lower fan 534. About the periphery of the plate 500 is a mounting flange 550 which mates with mounting flange 140 of the EAC 20, at the terminus of the cylindrical wall 26. The flange 550 is held in mating arrangement with the flange 140 by the band clamp 142. Thus, this embodiment 501 forms a hermetic container providing a single level of containment by compression of the O-ring seal 147.

For testing heat transfer capabilities and air flow measurements, two slabs of approximately 1.25 inch thick 6061-T6 aluminum were used to form a pair of single quadrant heat exchangers. Spaces were milled out to form the array of columns and rows of pin-fins, as well as the full and half ribs, resulting in a pair of quadrant (pie-shaped) plates with an approximately 7 inch radius. The smooth faces of the 0.125 inch thick plates were hand lapped to such an extent that the faces were less than 0.001 of an inch from theoretic flatness. The pair of heat exchangers were assembled in a back-to-back manner.

The two quadrants each included a pair of arrays of diamond-shaped pin-fins as shown in FIG. 7. Each pin-fin was approximately 1.0 inch high and the air gap between the pin fins was approximately 0.125 inches.

A box fan was mounted on each side of the plates, near the apex of the quadrants, and used to drive air past the pin-fins. The box fan included a brushless D.C. motor. A full speed load for this fan was 2.1 watts at 28 VDC. The fan was 0.792 inches thick and weighed 0.31 pounds. The box fan delivered 17 cfm of air at 0.05 inches of water column static pressure. Air velocity through the pair of arrays of pin-fins in the quadrant was measured along the circumference of the plenum space. The results for three different voltages applied to the box fan are presented in FIG. 10.

In FIG. 10, the measured air velocity in feet per minute is plotted as a function of angular position between the two ribs defining the quadrant. The uppermost curve 600 represents the air velocities measured when 28 volts was applied to the box fan. The middle curve 602 represents the air velocities measured when 24 volts was applied to the box fan. The lower curve 604 represents the air velocities measured when 20 volts was applied to the box fan. The graph also presents the location of the full ribs 606 and the half rib 608 for reference in relationship to the air velocity curves.

In general, the more uniform the flow, the more efficient the array of pin-fins will be in transferring heat.

The data in FIG. 10 indicates that the flow of air occurs over the entire array of pin-fins. However, a slight decrease in air flow is observed from 90° to 0° of a quadrant. This slight decrease is explained by the fact that the fan is located at the apex of the quadrant and that the impeller rotates in a clockwise direction. This arrangement creates a higher static pressure near the full fin located at 90°. The half rib at 45° serves in part to minimize this effect. Flow peaks are observed near the ribs and represent relatively unimpeded air flow along the full and half rib walls.

The ratio of air passing the two arrays in the quadrant is approximately 1.0:1.5. This is an acceptable ratio, since heat transfer is known to be a function of the square root of flow velocity. Thus, the ratio of heat transfer between the two arrays is approaching 1.0:1.2. The actual ratio, however, is somewhat higher than 1.0:1.2, since the flow velocity also contributes to the heat capacity of the air flow. Although the flows across both arrays may be equalized by installing a flow restricting screen or similar device, it is believed that solution would be detrimental since the gain would be marginal due to increased static pressure on the fan and a resulting lower flow rate.

The combined back-to-back single quadrant heat exchanger was also tested for its heat transfer capabilities. The test involved thermally isolating a source of heat such that the back-to-back heat exchanger represented the only heat pathway.

Figure 11:
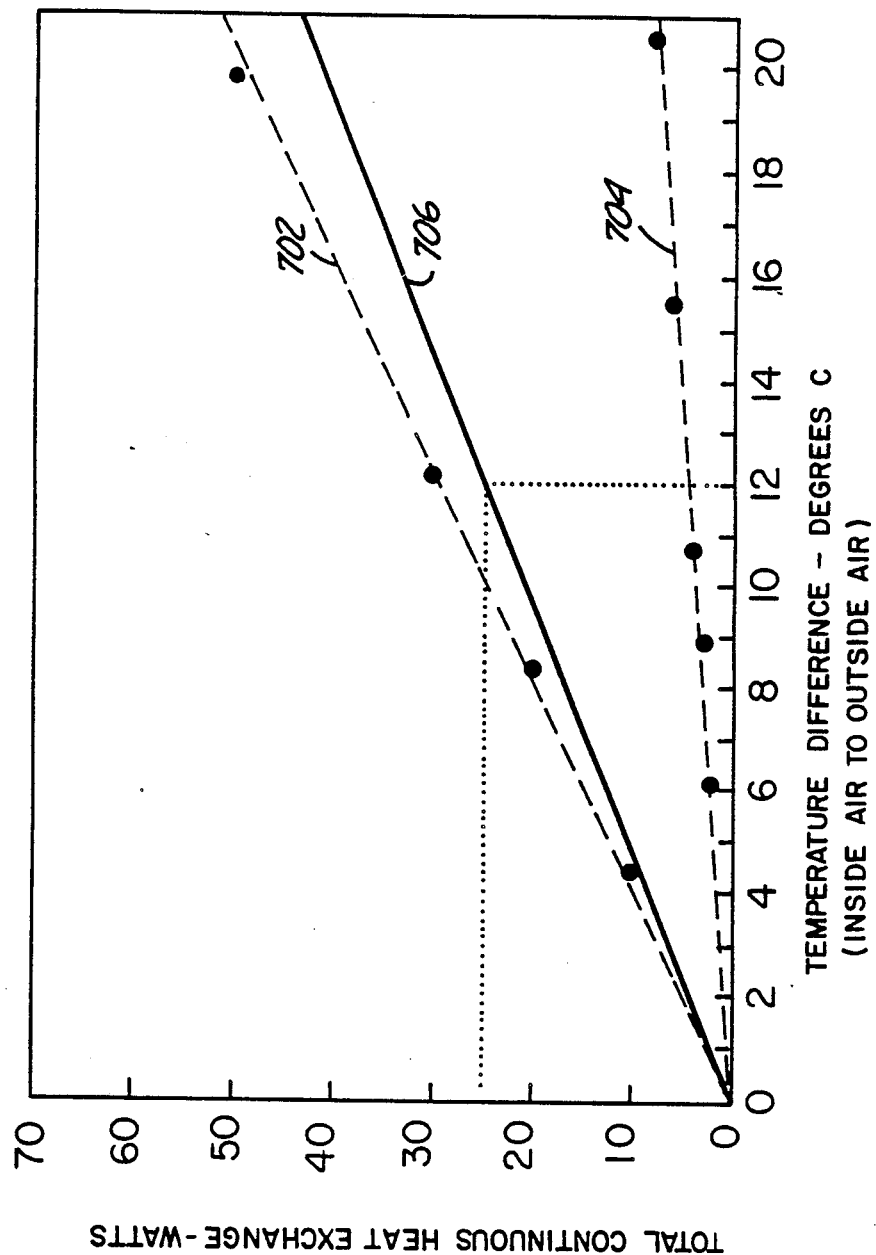
FIG. 11 is a graphical view of the performance of the present invention.

Specifically, the heat exchanger assembly was mounted on a ⅜ inch plexiglass plate insulated with one inch of rigid insulation. The plexiglass plate was placed on a container with the second heat exchanger facing inward. The container was insulated with 4 to 6 inches of fiberglass insulation. A resistive heating element was included within the insulated container to serve as a heat input. Thermocouples were used to measure the temperature on both sides of the heat exchanger. A 25 watt heat load was simulated by the combination of the resistive heater and the internal fan. Both the fans were operated at 24 VDC. The heat exchanger equilibrated at a temperature differential of about 10° C. Tests with an insulated cover and heat exchanger suggest that the system contributed a temperature differential of about 2° C. Thus, the single quadrant heat exchanger transferred 25 watts (resistive heat and internal fan) at a temperature differential of 12° C. when 24 VDC was applied to the fans. These data, along with data from tests at other resistive inputs, are presented in FIG. 11. The heat inputs in watts and the temperature differentials associated with the heat inputs (at equilibrium) are plotted and a best line drawn 702. The heat inputs and temperature differentials, at equilibrium, resulting when a fully insulated cover is substituted for the heat exchanger are plotted and a best line drawn 704. Subtracting line 704 from line 702 indicates the heat transfer capabilities of the quadrant heat exchanger at line 706.

Based upon the data from the single quandrant heat exchanger, the capabilities of a four quadrant back-to-back heat exchanger are estimated to be 100 watts continuously transferred from the SCC to the Orbiter cabin air at 24.0 VDC operation. Additionally, the four external fans produce 6.4 watts. Therefore, 106.4 watts of heat is discharged into the Orbiter cabin air when a 100 watt source is maintained at a temperature differential of 12.0° C. between the SCC environment and the Orbiter air. The four external fans generate a 55 CFM flow across the pin-fin arrays. The noise level is less than 40 dB-A.

The configuration shown in FIGS. 1–8 adds approximately 9.1 pounds to a similar containment device lacking a heat exchanger.

Although the present invention has been described with reference to preferred embodiments, workers skilled in the art will recognize that changes may be made in form and detail without departing from the spirit and scope of the invention.

What is claimed is:

1. A heat exchanger comprising:
    a plate made of heat conductive material having a first major face and a second major face;
    a plurality of diamond-shaped heat transfer elements projecting from the first face and integral with the plate, the elements being arranged in a wedge-shaped array; and
    a panel substantially parallel to and spaced apart from the first face and defining a plenum space that encloses the wedge-shaped array of the heat transfer elements, the plenum space including a half rib located between a pair of arrays.

2. The heat exchanger of claim 1 wherein the plate is circular and has a center, the wedge-shaped array is radially disposed about the center.

3. The heat exchanger of claim 1 wherein the heat transfer elements are longitudinal projections 4. The heat exchanger of claim 1 wherein the heat conductive material includes aluminum.

5. The heat exchanger of claim 1 wherein the heat conductive material includes copper.

6. The heat exchanger of claim 1 further including means to move a fluid in communication with the plenum space.

7. The heat exchanger of claim 1 wherein the wedge-shaped array includes a plurality of rows and column of the heat transfer elements.

8. The heat exchanger of claim 7 wherein the heat transfer elements each have four faces, the plurality of rows have an axis, the plurality of columns have an axis, and the axis of the plurality of rows and the axis of the plurality of columns are each parallel to faces of the heat transfer elements.

9. The heat exchanger of claim 1 wherein the heat exchanger includes four quadrants each with a pair of wedge-shaped arrays forming a circular heat exchanger about a center point.

10. The heat exchanger of claim 9 wherein the plate is circular, the plenum spaces extend outwardly from the center, and further including means to move a fluid located proximate the center of the plate.

11. The heat exchanger of claim 1 wherein the second major face of the heat exchanger is smooth.

12. A heat exchanger for use in a triple containment system wherein heat production occurs in a first container and a first heat transfer fluid is disposed within a second hermetically sealed container with the heat transfer fluid being in fluid communication with an exterior surface of the first container, the second hermetically sealed container being disposed within a third container that is hermetically sealed from an outside environment, the heat exchanger comprising:
    conductive plate means having a first plurality of spaced apart pins extending from a first surface and a second plurality of pins extending from an oppositely facing second surface, the first plurality of pins being in heat transfer relationship with the environment and the second plurality of pins being in heat transfer relationship with the heat transfer fluid in the second container and wherein the plate means includes first and second discrete plates having first and second smooth surfaces facing each other in conductive heat transfer relationship;
    first means for moving the heat transfer fluid within the second container past the second plurality of pins; and second means for moving air from the environment past the first plurality of pins.

13. A heat exchanger for use in a triple containment system wherein heat production occurs in a first container and a first heat transfer fluid is disposed within a second hermetically sealed container with the heat transfer fluid being in fluid communication with an exterior surface of the first container, the second hermetically sealed container being disposed within a third container that is hermetically sealed from an outside environment, the heat exchanger comprising:
  conductive plate means having a first plurality of spaced apart pins extending from a first surface and a second plurality of pins extending from an oppositely facing second surface, the first plurality of pins being in heat transfer relationship with the environment and the second plurality of pins being in heat transfer relationship with the heat transfer fluid in the second container and wherein the plate means includes first and second discrete plates having first and second smooth surfaces facing in physical contact;
  first means for moving the heat transfer fluid within the second container past the second plurality of pins; and
  second means for moving air from the environment past the first plurality of pins.

14. The heat exchanger of claim 13 wherein the first means to move fluid is a fan.

15. The heat exchanger of claim 14 wherein the second means to move air is a fan.

16. A heat exchanger for use in a triple containment system wherein heat production occurs in a first container and a first heat transfer fluid is disposed within a second hermetically sealed container with the heat transfer fluid being in fluid communication with an exterior surface of the first container, the second hermetically sealed container being disposed within a third container that is hermetically sealed from an outside environment, the heat exchanger comprising:
  conductive plate means having a first plurality of spaced apart pins extending from a first surface and a second plurality of pins extending from an oppositely facing second surface, the first plurality of pins being in heat transfer relationship with the environment and the second plurality of pins being in heat transfer relationship with the heat transfer fluid in the second container and wherein the pins of the first plurality of pins each have a diamond-shaped cross section;
  first means for moving the heat transfer fluid within the second container past the second plurality of pins; and
  second means for moving air from the environment past the first plurality of pins.

17. The heat exchanger of claim 16 wherein the pins of the second plurality of pins each have a diamond-shaped cross section.

18. A heat exchanger comprising:
  a plate made of heat conductive material having a first major face and a second major face;
  a first wedge-shaped array of a first plurality of spaced apart heat transfer elements projecting from the first face and integral with the plate wherein the first plurality of spaced-apart heat transfer elements are pins having a diamond-shaped cross section;
  a second wedge-shaped array of a plurality of spaced apart heat transfer elements projecting from the second face and integral with the plate;
  means to move a first heat transfer past the first array; and
  means to move a second heat transfer fluid past the second array.

19. A heat exchanger comprising:
  a plate made of heat conductive material having a first major face and a second major face;
  a first wedge-shaped array of a first plurality of spaced apart heat transfer elements projecting from the first face and integral with the plate;
  a second wedge-shaped array of a plurality of spaced apart heat transfer elements projecting from the second face and integral with the plate; wherein the second plurality of spaced-apart heat transfer elements have a diamond-shaped cross section;
  means to move a first heat transfer past the first array and
  means to move a second heat transfer fluid past the second array.

20. A heat exchanger for use in a triple containment system wherein heat production occurs in a first container and a first heat transfer fluid is disposed within a second container with the heat transfer fluid being in fluid communication with an exterior surface of the first container, the second sealed container being disposed within a third container that is sealed from an outside environment, the heat exchanger comprising:
  a first discrete conductive plate having a first surface with a first plurality of spaced apart pins extending from the first surface and a smooth second surface, wherein the first plurality of pins are in heat transfer relationship with the environment;
  a second discrete conductive plate having a first surface with a second plurality of spaced apart points extending from a first surface and a smooth second surface; wherein the second plurality of pins are in a heat transfer relationship with the heat transfer fluid of the second container, and the smooth side of the second plate is in conductive heat transfer relationship with the smooth side of the first plate.

* * * * *

UNITED STATES PATENT AND TRADEMARK OFFICE
CERTIFICATE OF CORRECTION

PATENT NO. : 4,997,034
DATED : March 5, 1991
INVENTOR(S) : James E. Steffen et al.

It is certified that error appears in the above-identified patent and that said Letters Patent is hereby corrected as shown below:

Col. 10, line 18, after "projections", insert --.--.

Col. 10, line 27, delete "column", insert --columns--.

Col. 12, line 49, delete "points", insert --pins--.

Signed and Sealed this

Fourth Day of August, 1992

Attest:

DOUGLAS B. COMER

*Attesting Officer*  *Acting Commissioner of Patents and Trademarks*